United States Patent Office 3,405,351
Patented Oct. 8, 1968

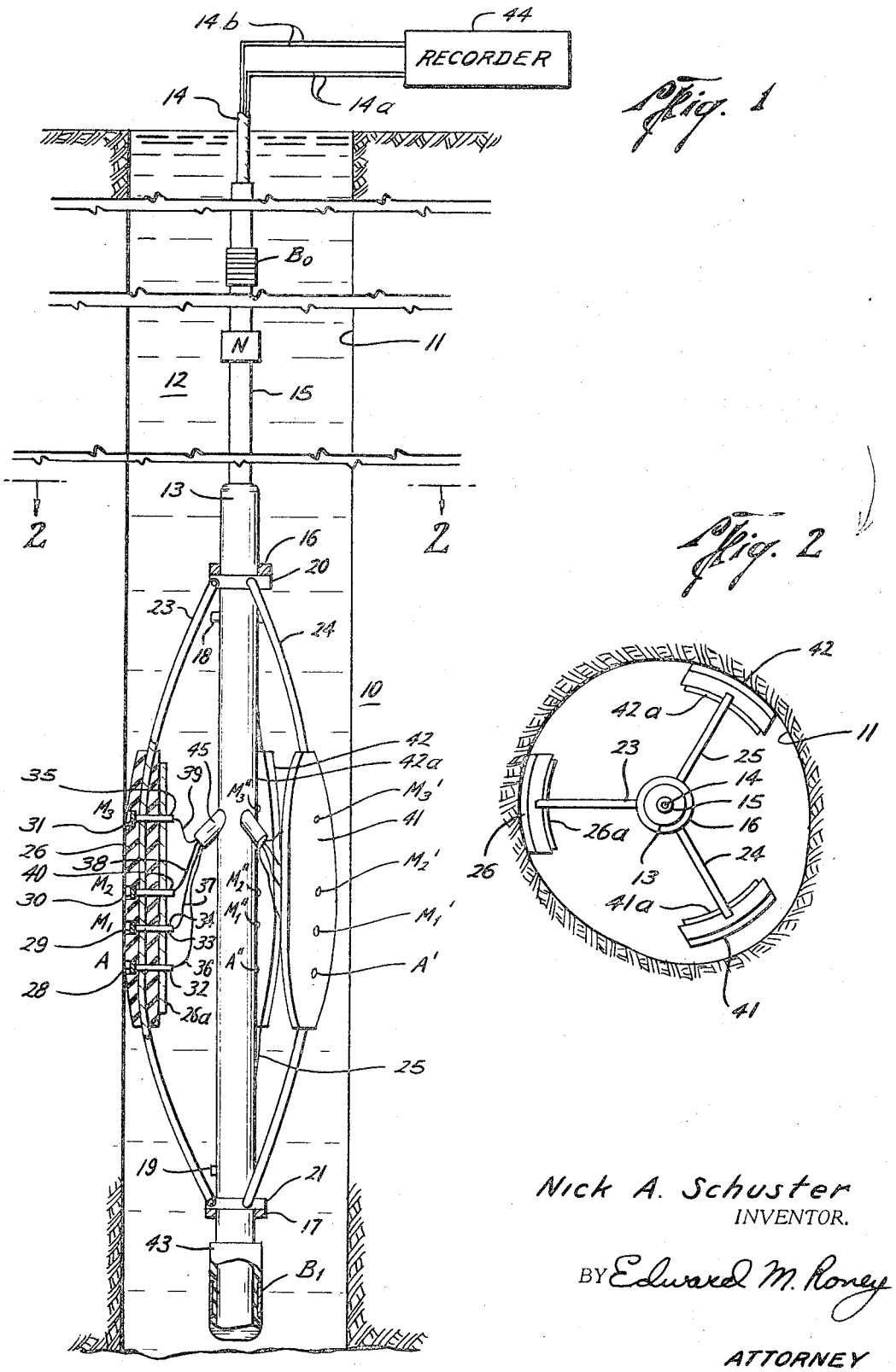

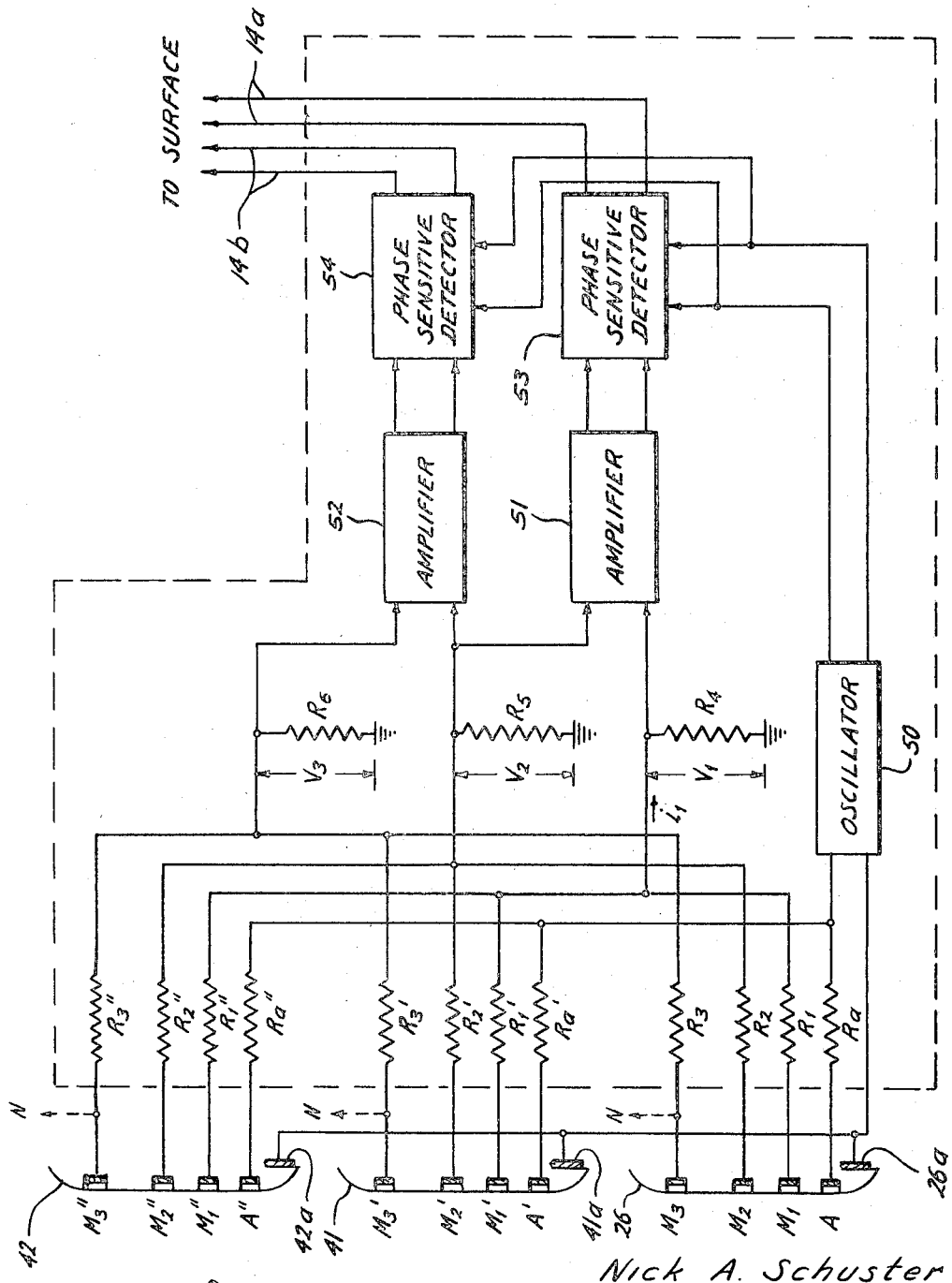

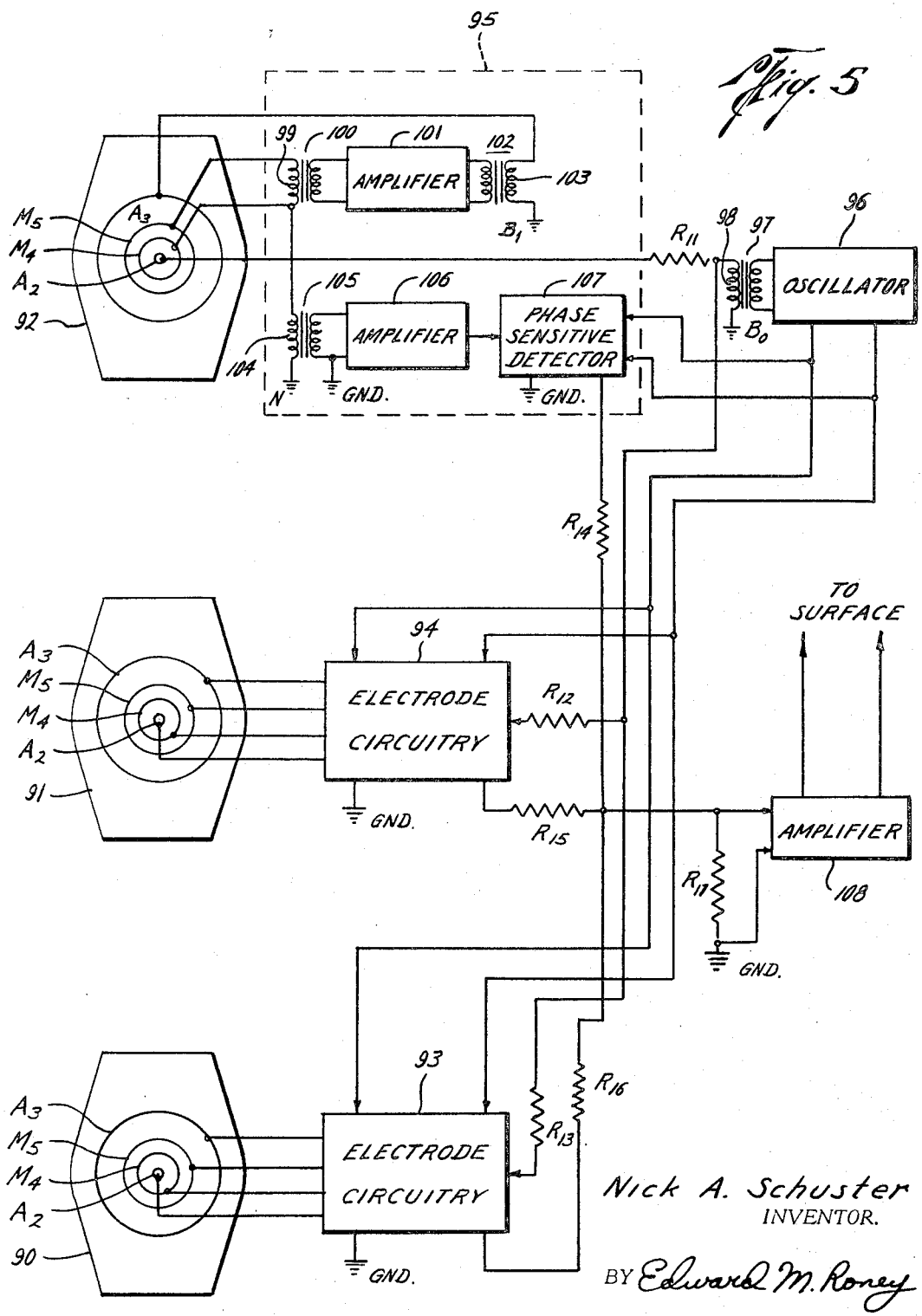

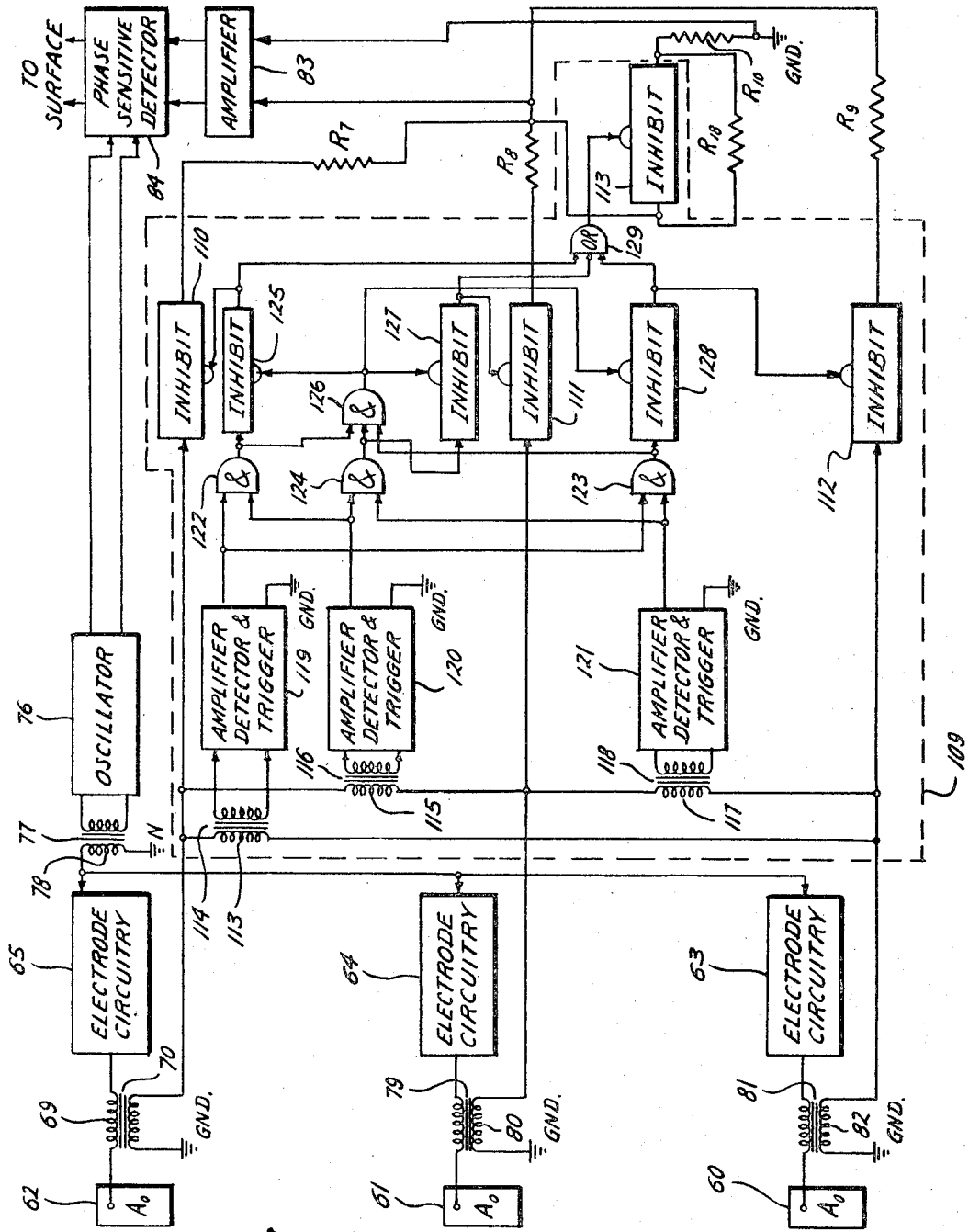

3,405,351
METHODS AND APPARATUS FOR AVERAGING WELL LOGGING MEASUREMENTS
Nick A. Schuster, Houston, Tex., assignor to Schlumberger Technology Corporation, Houston, Tex., a corporation of Texas
Filed Nov. 22, 1966, Ser. No. 596,204
17 Claims. (Cl. 324—10)

ABSTRACT OF THE DISCLOSURE

In accordance with an illustrative embodiment of the invention, the measurements derived from a plurality of investigating devices spaced at a plurality of circumferential points around the wall of a borehole are averaged to provide one averaged measurement. This averaged measurement is desirably more accurately representative of the characteristic of the formations which is measured than the individual measurements. In another embodiment, the individual measurements are monitored to determine the magnitudes of the individual measurements relative to one another and any measurement which is relatively different from the other measurements is inhibited from being averaged. If, on the other hand, all of the measurements are relatively different from one another, then all of the measurements are averaged to provide the best possible result.

---

This invention relates to methods and apparatus for investigating subsurface earth formations traversed by a borehole. More specifically, it has to do with well logging methods and apparatus of the type wherein electrodes are mounted on pad members adapted to engage the borehole wall for providing indications of the electrical resistivity or conductivity of the surrounding earth formations.

When investigating earth formations surrounding a borehole with a pad mounted electrode system, it is not uncommon for all or part of the wall-engaging face of the pad member to be separated from the wall of the borehole due to such things as odd shaped boreholes, or rugose walls of the borehole. In this event, the resistivity or conductivity readings derived from the pad mounted electrode system will be in error since the resistivity of the mud would now be a factor in the obtained resistivity or conductivity reading. Since the resistivity of the mud is generally less than that of the earth formations surrounding the borehole, much of the current emitted from the electrodes on the pad member will short to the current return electrode, thus rendering the well logging measurements inaccurate.

It is an object of the invention therefore to provide new and improved well logging methods and apparatus for investigating subsurface earth formations surrounding a borehole wherein wall-engaging pad members are utilized.

In accordance with one feature of the invention, apparatus for investigating earth formations traversed by a borehole comprises a central support member adapted for movement through the borehole and a plurality of pad members supported by the central support member and adapted to engage the borehole wall. The apparatus further comprises a plurality of electrodes, at least some of which are located on the plurality of pad members. The apparatus further comprises means for supplying current to at least one of the electrodes for emission into the surrounding earth formations and means coupled to at least one electrode on each pad member for deriving a signal representative of a characteristic of the surrounding earth formations. The apparatus further includes means for averaging the derived signals to produce an averaged output signal which is more accurately representative of the formation characteristic.

In accordance with another feature of the present invention, methods and apparatus for investigating earth formations traversed by a borehole comprises moving a plurality of well logging investigating devices through the borehole, the investigating devices being located at a plurality of circumferential points around the borehole. The invention further comprises deriving a signal from each of the investigating devices indicative of a characteristic of the surrounding earth formations, averaging the signals derived from each of the investigating devices, and generating one signal indicative of the average value of the derived signals.

For a better understanding of the present invention, together with other and further objects thereof, reference is had to the following description taken in connection with the accompanying drawings, the scope of the invention being pointed out in the appended claims.

Referring to the drawings:

FIGURE 1 illustrates the mechanical features of the well logging apparatus of the present invention, including one embodiment of the configuration of the pad mounted electrodes;

FIGURE 2 shows a cross-sectional view of the apparatus of FIGURE 1 located in an odd shaped borehole;

FIGURE 3 illustrates one embodiment of the electrode configuration utilized with the present invention along with a schematic representation of the electrical circuitry to be utilized therewith;

FIGURE 5 illustrates still another embodiment of the electrode configuration together with a schematic representation of the electrical circuitry to be utilized therewith; and FIGURE 6 illustrates one electrode on each pad member of the apparatus of FIGURE 4 together with another embodiment of the electrical circuitry to be utilized with the present invention.

Figure 4:
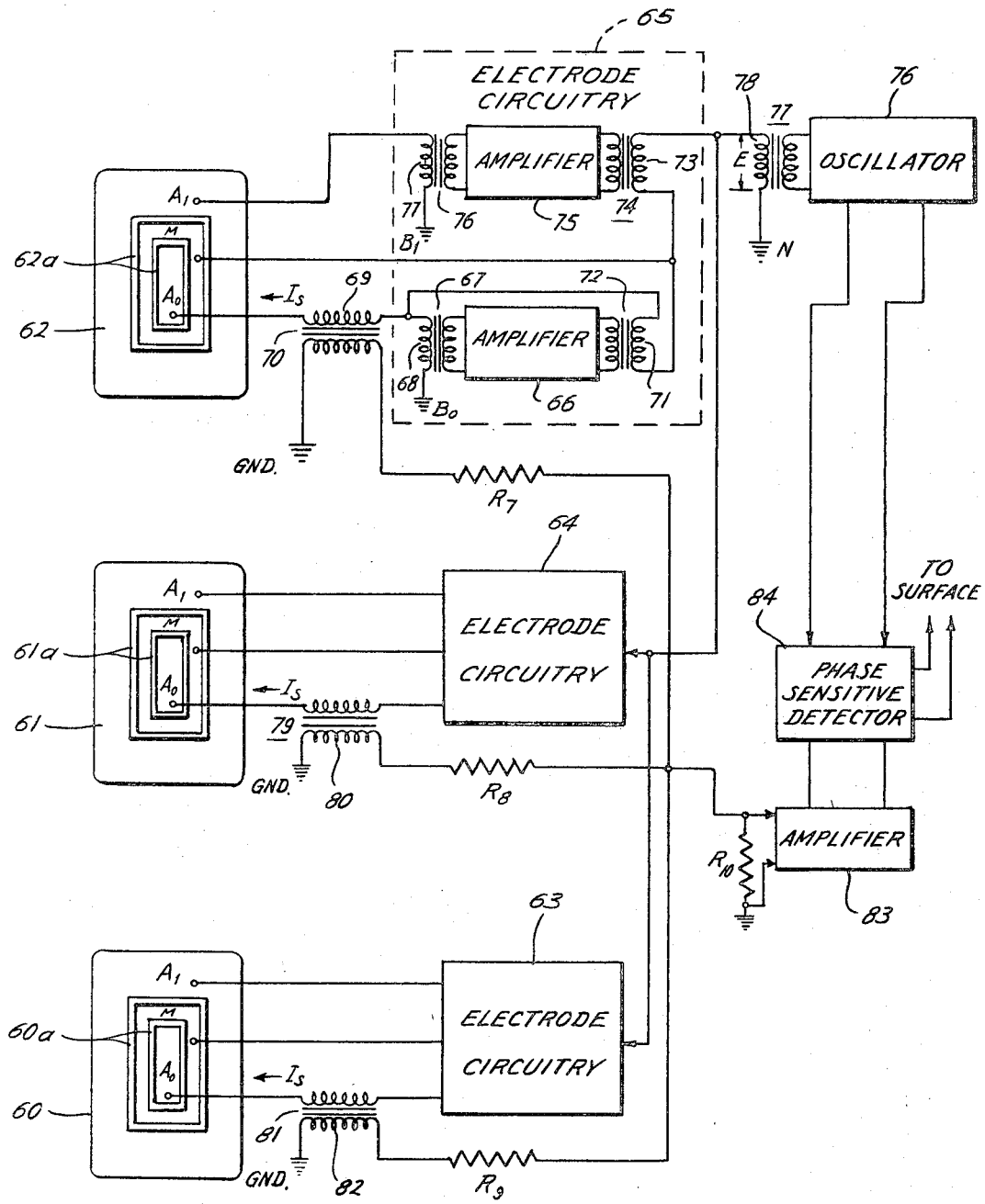
FIGURE 4 illustrates another embodiment of the electrode configuration together with a schematic representation of the electrical circuitry to be utilized therewith.

Referring to FIGURE 1 of the drawings, there is shown a representative embodiment of the mechanical apparatus constructed in accordance with the present invention along with one embodiment of the electrodes, for investigating subsurface earth formations 10 traversed by a borehole 11. The borehole 11 is filled with the conductive drilling fluid or drilling mud 12. The borehole investigating apparatus includes an elongated central support member 13, the interior portion of which has a fluid-tight housing containing the downhole electrical circuitry. The central support member 13 is suspended from the surface of the earth by means of an armored multiconductor cable 14, the lower 100 feet or so of which is covered with an electrical insulation material 15. At the surface of the earth, the cable 14 is reeled in and out of the borehole by a drum and winch mechanism (not shown).

Secured to the central support member 13 are an upper collar 16 and a lower collar 17, both rigidly secured to the support member 13. Located somewhat below the upper collar 16 is an upper stop means 18 rigidly secured to the support member 13. Located just above the lower collar 17 is a lower stop means 19, likewise secured to the central support member 13. Located intermediate of the upper fixed collar 16 and upper stop means 18 is a slidable collar 20. Located between the lower fixed collar 17 and the lower stop means 19 is a lower slidable collar 21. A plurality of bowed springs 23, 24 and 25 are each pivotally mounted to upper and lower slidable collars 20 and 21 and are located at equally spaced-apart locations around the circumference of central support member 13. In this case, the three bowed springs 23, 24 and 25 are spaced 120° apart around the circumference of central support member 13.

Bowed spring 23 passes through the interior portion of pad member 26 (shown in cross section) securing pad member 26 to bowed spring 23. The pad member 26 has a metal plate 26a secured to the back side thereof. Formed in the pad member 26 are a plurality of recesses 28, 29, 30 and 31 within which are embedded a plurality of electrodes A, $M_1$, $M_2$ and $M_3$ respectively. The survey current-emitting electrode A is located near the bottom of pad member 26. Located just above the survey current electrode A is a first monitor electrode $M_1$. Located just above the first monitor electrode $M_1$ is a second monitor electrode $M_2$, and a third monitor electrode $M_3$ is located above the second monitor electrode $M_2$. A plurality of hollow tubes 32, 33, 34 and 35 made of nonconductive material pass from the electrodes A, $M_1$, $M_2$ and $M_3$ respectively through an opening in the bowed spring 23 and the metal back plate 26a to provide a passage for the conductors which connect the electrodes to the electrical circuitry within central support member 13. A plurality of conductors 36, 37, 38, 39 and 40 connect electrodes A, $M_1$, $M_2$, $M_3$, and the pad back plate 26a respectively to the electrical circuitry contained within support member 13 through a conduit 45.

In like fashion, a wall-engaging pad member 41 is fixed to bowed spring 24 and a wall-engaging pad member 42 is fixed to bowed spring 25. Pad member 41 has a plurality of electrodes A', $M_1'$, $M_2'$ and $M_3'$, located thereon in the same manner as pad member 26. Likewise, pad member 42 has a plurality of electrodes A'', $M_1''$, $M_2''$ and $M_3''$. Pad member 41 has a pad back plate 41a (not shown) in the same manner as pad back plate 26a and pad member 42 has a pad back plate 42a. A plurality of conductors connect the electrodes on pad members 41 and 42 to the electrical circuitry within support member 13 in the same manner as pad member 26.

An electrode N is shown located above the central support member 13 on the insulated portion 15 of cable 14. A current return electrode $B_0$ is shown located somewhat above the electrode N on the insulated portion 15. A current return electrode $B_1$ is located on the bottom portion of the support member 13 (shown in cross section). This $B_1$ current return electrode is of generally cylindrical shape and is mounted on suitable electrical insulation material which either covers or forms the nose portion 43 of support member 13. Electrical connections to the electrodes N, $B_0$ and $B_1$ are made by conductors (not shown) which pass through the cable 14 for N and $B_0$, and through the support member 13 for $B_1$. The electrodes N, $B_0$, and $B_1$ are utilized with various embodiments of the present invention, not all of the electrodes shown being utilized with each embodiment. The signals indicative of the information obtained by the well logging apparatus are transmitted from the electrical circuitry within downhole support member 13 through armored multiconductor cable 14 via conductor pairs 14a and 14b to a recorder 44 at the surface of the earth.

The bowed springs 23, 24 and 25 pivotally mounted on slidable collars 20 and 21 are adapted to urge the pad members 26, 41 and 42 toward the wall of the borehole, and yet allow the well logging apparatus to pass through relatively narrow portions of the borehole. This is accomplished since the slidable collars 20 and 21 are adapted to slide between fixed collars 16 and 17 and stop means 18 and 19, with the spring action of bowed springs 23, 24 and 25 maintaining the pad members 26, 41 and 42 pressed outwardly. The particular apparatus shown in FIGURE 1 for maintaining the pad members in a wall-engaging position is only exemplary, and other types of well logging apparatus for maintaining electrodes in a wall-engaging position could be utilized.

Looking now at FIGURE 2, there is shown a cross section view taken along the section line 2—2 of FIGURE 1. The borehole 11 is shown to be odd shaped, that is, other than a circular shape. One of the pad members 41 is shown to not be in contact with the wall of the borehole due to this odd shape of the borehole. When one of the pad members is removed from the wall of the borehole, such as pad member 41 in FIGURE 2, the readings obtained from the electrodes mounted on that particular pad member will be in error. If pad member 41 were the only pad member for investigating subsurface earth formations, then there would be no accurate measurements of the subsurface earth formations during the time when pad member 41 is in the position shown in FIGURE 2.

Looking now at FIGURE 3, there is shown apparatus for providing substantially accurate measurements of subsurface earth formations under such adverse borehole conditions as shown in FIGURE 2. The FIGURE 3 apparatus includes the pad members 26, 41 and 42 with the same electrodes as shown in FIGURE 1 and having the same designations. The survey current electrodes A, A' and A'' are connected through resistors $R_A$, $R_A'$ and $R_A''$ respectively to one of the output terminals of an oscillator 50. Resistors $R_A$, $R_A'$ and $R_A''$ have equal resistance. The other output from oscillator 50 is supplied to the pad back plates 26a, 41a and 42a of pad members 26, 41 and 42. Monitor electrodes $M_1$, $M_1'$ and $M_1''$ are connected through resistors $R_1$, $R_1'$ and $R_1''$ respectively, to one side of a resistor $R_4$ and one side of the input to an amplifier 51. The other side of resistor $R_4$ is connected to chassis ground. The ground designation corresponds to a common point for the electrical circuitry located within the fluid-tight housing of central support member 13 and could be, for example, the amplifier housing.

The monitor electrodes $M_2$, $M_2'$ and $M_2''$ are connected through resistors $R_2$, $R_2'$ and $R_2''$ respectively to one side of a resistor $R_5$, one input of an amplifier 52, and to the other input to amplifier 51. Amplifiers 51 and 52 both have high input impedance. The other side of resistor $R_5$ is connected to chassis ground. Monitor electrodes $M_3$, $M_3'$ and $M_3''$ are connected through resistors $R_3$, $R_3'$ and $R_3''$ respectively, to one side of a resistor $R_6$ and to the other input to amplifier 52. The other side of resistor $R_6$ is connected to chassis ground. The output of amplifier 51 is connected to the input of a phase-sensitive detector 53, the output from phase-sensitive detector 53 being supplied to the surface of the earth via conductor pair 14a. The output from amplifier 52 is supplied to the input to a phase-sensitive detector 54, the output of which is supplied to the surface of the earth via conductor pair 14b. Oscillator 50 supplies the phase-reference signal to phase-sensitive detectors 53 and 54. Resistors $R_1$, $R_1'$, $R_1''$, $R_2$, $R_2'$, $R_2''$, $R_3$, $R_3'$ and $R_3''$ desirably have equal resistance values.

Now concerning the operation of the FIGURE 3 apparatus oscillator 50 supplies a substantially constant voltage output signal. Resistors $R_A$, $R_A'$ and $R_A''$ are relatively large in magnitude so that a relatively constant current will be supplied to the survey current electrodes regardless of the resistivity between the various survey current electrodes and their respective pad back plates through the earth formations. By this means, if one of the pad members should be separated from the wall of the borehole, as pad 41 in FIGURE 2, thus causing a substantial portion of the current emitted from the survey current electrode of that pad member to short directly to the pad back plate, the survey current being emitted by the remaining survey current electrodes of the other two pad members will remain substantially constant.

Concerning the monitor electrode circuitry, the voltage sensed by each monitor electrode of a given set of monitor electrodes, that is, $M_1$, $M_1'$, $M_1''$ or $M_2$, $M_2'$, $M_2''$ or $M_3$, $M_3'$, $M_3''$, are applied to a resistor network which determines the average voltage of the three corresponding monitor electrodes. To accomplish this averaging, the resistors $R_1$, $R_2$ and $R_3$ etc., have a substantially greater value of resistance than do the resistors $R_4$, $R_5$ and $R_6$. Thus, the voltage $V_1$ developed across resistor $R_4$ is the average of the voltages sensed by monitor electrodes $M_1$, $M_1'$ and $M_1''$; the voltage $V_2$ across resistor $R_5$ is proportional to the average of the voltages sensed by monitor electrodes $M_2$, $M_2'$ and $M_2''$; and the voltage $V_3$ across resistor $R_6$ is the average of the voltages sensed by monitor electrodes $M_3$, $M_3'$ and $M_3''$. Amplifier 51 senses the difference in potential between $V_1$ and $V_2$, and after amplification, supplies a signal proportional to $V_1$–$V_2$ to phase-sensitive detector 53. The output signal from phase-sensitive detector 53 is a DC signal proportional to that portion of $V_1$–$V_2$ which is in-phase with the phase-reference signal from oscillator 50. In the same manner, the output signal from phase-sensitive detector 54 is proportional to that portion of the difference in potential between $V_2$ and $V_3$ which is in-phase with the output signal from oscillator 50.

Thus, the signal on conductor 14a will be proportional to the difference in potential between the average of the voltages on monitor electrodes $M_1$, $M_1'$ and $M_1''$ and the average of the voltages on monitor electrodes $M_2$, $M_2'$ and $M_2''$. Likewise, the signal on conductor 14b will be proportional to the difference in potential between the average of the voltages on monitor electrodes $M_2$, $M_2'$ and $M_2''$ and the average of the voltages on $M_3$, $M_3'$ and $M_3''$. If now one of the pad members should become removed from the wall of the borehole, the error which will be present in the voltage derived across the resistors $R_4$, $R_5$ or $R_6$ will be ⅓ as large as the error which would be present if only one pad member were utilized. Alternatively, the remote electrode N, shown in FIGURE 1, could be substituted for monitor electrodes $M_3$, $M_3'$ and $M_3''$. This is represented by the dotted line pointing to N in FIGURE 3.

In co-pending application Ser. No. 566,019 by F. M. Eaton, filed on July 18, 1966, it has been shown that, with the electrode configuration of the FIGURES 1 and 3 apparatus, it is desirable to take the ratio (considering one pad member) of the difference in potential between the monitor pair $M_1$–$M_2$ and the monitor pair $M_2$–$M_3$. This ratio signal provides an indication of the presence or absence of a mudcake on the wall of the borehole, which is indicative of permeable or impervious earth formations surrounding the borehole. In the FIGURE 3 embodiment, this would correspond to taking the ratio of the signals on conductor pairs 14a and 14b. By taking the ratio of these two output signals, if one of the pad members becomes separated from the wall of the borehole, as shown in FIGURE 2, then there will be very little, if any, error in the ratio of these two output signals.

This can better be understood by looking at the mathematical relationships for the signals derived by the apparatus of FIGURE 3. The total current $i_1$ from monitor electrodes $M_1$, $M_1'$ and $M_1''$ flows primarily through resistor $R_4$ since the input impedance to amplifier 51 is very high in comparison to the resistance of resistor $R_4$. Since the resistance of $R_4$ is much less than the resistance of $R_1$, $R_1'$ and $R_1''$, $R_4$ can be neglected in determining the value of $i_1$. Thus, the relationship for $i_1$ can be written as:

$$i_1 = \frac{V_{M_1}}{R_1} + \frac{V_{M_1'}}{R_1'} + \frac{V_{M_1''}}{R_1''} \quad (1)$$

where $V_{M_1}$ is the voltage on monitor electrode $M_1$, $V_{M_1'}$ is the voltage on monitor electrode $M_1'$, and $V_{M_1''}$ is the voltage on monitor electrode $M_1''$.

The voltage $V_1$ developed across resistor $R_4$ is equal to:

$$V_1 = \frac{V_{M_1}}{R_1}R_4 + \frac{V_{M_1'}}{R_1'}R_4 + \frac{V_{M_1''}}{R_1''}R_4 \quad (2)$$

Since $R_1 = R_1' = R_1''$, Equation 2 can be rewritten as:

$$V_1 = \frac{R_4}{R_1}(V_{M_1} + V_{M_1'} + V_{M_1''}) \quad (3)$$

Equation 3 is the relationship for $V_1$ whatever may be the position of the pad members. If the pad members are all flush against the wall of the borehole, then $$V_{M_1} = V_{M_1'} = V_{M_1''}$$

(except in certain instances where the earth formations are not concentrically homogeneous with respect to the borehole). Thus, Equation 3 can be rewritten as:

$$V_1 = \frac{3R_4 V_{M_1}}{R_1} \quad (4)$$

By the same procedure, the voltage $V_2$ developed across resistor $R_5$ will be equal to:

$$V_2 = \frac{R_5}{R_2}(V_{M_2} + V_{M_2'} + V_{M_2''}) \quad (5)$$

where $V_{M_2}$ is the voltage on monitor electrode $M_2$, $V_{M_2'}$ is the voltage on monitor electrode $M_2'$ and $V_{M_2''}$ is the voltage on monitor electrode $M_2''$. Thus, in the case where all of the pad members are flush, Equation 5 can be rewritten as:

$$V_2 = \frac{3R_5 V_{M_2}}{R_2} \quad (6)$$

Likewise, the voltage $V_3$ developed across resistor $R_6$ can be written as:

$$V_3 = \frac{R_6}{R_3}(V_{M_3} + V_{M_3'} + V_{M_3''}) \quad (7)$$

where $V_{M_3}$ is the voltage on monitor electrode $M_3$, $V_{M_3'}$ is the voltage on monitor electrode $M_3'$ and $V_{M_3''}$ is the voltage on monitor electrode $M_3''$.

When all of the pads are flush against the borehole wall, Equation 7 can be rewritten as:

$$V_3 = \frac{3R_6}{R_3} V_{M_3} \quad (8)$$

If now, the ratio of the output signals from phase-sensitive detectors 53 and 54 are taken, the ratio signal $V_R$ can be written as:

$$V_R = \frac{V_1 - V_2}{V_2 - V_3} \quad (9)$$

Combining Equations 4, 6, 8 and 9:

$$V_R = \frac{V_{M_1} - V_{M_2}}{V_{M_2} - V_{M_3}} \quad (10)$$

Thus, Equation 10 gives the ratio voltage $V_R$ in an errorless situation.

Now, for the case where one of the pad members is not flush against the wall of the borehole, the ratio voltage $V_R$ will be equal to:

$$V_R = \frac{\frac{R_4}{R_1}(3V_{M_1} - E_1) - \frac{R_5}{R_2}(3V_{M_2} - E_2)}{\frac{R_5}{R_2}(3V_{M_2} - E_2) - \frac{R_6}{R_3}(3V_{M_3} - E_3)} \quad (11)$$

where $E_1$ is the error voltage from $M_1$, $M_1'$, or $M_1''$, $E_2$ is the error voltage from $M_2$, $M_2'$, or $M_2''$, and $E_3$ is the error voltage from $M_3$, $M_3'$, or $M_3''$.

Rearranging Equation 11:

$$V_R = \frac{3V_{M_1} - E_1 - 3V_{M_2} + E_2}{3V_{M_2} - E_2 - 3V_{M_3} + E_2} \quad (12)$$

It can be seen from Equation 12 that the error voltage components $E_1$, $E_2$ and $E_3$ tend to cancel each other out. If one of the pad members separates from the wall of the borehole so that all of the electrodes of the separated pad are equal distance from the borehole wall, as shown in FIGURE 2, it is safe to assume that $E_1 = E_2 = E_3$. In this case Equation 12 can be written as:

$$V_R = \frac{V_{M_1} - V_{M_2}}{V_{M_2} - V_{M_3}} \quad (13)$$

It can be seen that Equation 13 is the same as Equation 10, which is the errorless situation. Thus, where one of the pad members becomes completely separated from the wall of the borehole, the ratio signal $V_R$ will be substantially errorless. The same procedure can be used to show that if two pad members become completely separated from the borehole wall, the ratio signal $V_R$ will still be accurate. Even if only part of one pad member should become removed from the wall of the borehole, any resulting error in the measurements will be substantially less with the apparatus of FIGURE 3 than by using one pad member only since the error voltage components tend to minimize each other. Even if one pad member is situated such as to produce a completely wrong measurement, the total error, using three pads, is only ⅓ as great as with one pad.

It is to be understood that although the above discussion concerns the example of three pad members, any number (greater than one) of pads could be used in this invention. For example, if two pads were used, Equations 1, 2, 3, 5 and 7 would have one less term (i.e., $V_{M_1}$ and $V_{M_1}'$ only) and Equations 4, 6, 8, 11 and 12 would substitute 2 for 3 (i.e., $2V_{M_1}$, $2V_{M_2}$, $2V_{M_3}$). However, the result would be the same, the only difference being that if only part of a pad becomes separated from the borehole wall so that $E_1 \neq E_2 \neq E_3$, more pads will result in less error. That is, two pads will reduce the error to one-half, three will reduce the error to one-third of the one pad case, etc.

Looking now at FIGURE 4, there is shown another embodiment of the present invention. In this embodiment, the pad members, designated 60, 61 and 62 are of the type shown in U.S. Patent No. 3,132,298 granted to H. G. Doll et al. on May 5, 1964. These pad members can be mounted on the bowed springs 23, 24 and 25 of FIGURE 1 in the same manner as pad members 26, 41 and 42 thereof, or can be mounted in a manner similar to that shown in the Doll et al. Patent No. 3,132,298, or in any other suitable manner. The electrodes designated $A_0$, M and $A_1$ are metal plates embedded in the pad members 60, 61 and 62 and having their faces exposed. That part of the pad members 60, 61 and 62 which is behind the face of the pad member containing the electrodes, comprises an insulation material, which insulation material 60a, 61a and 62a insulates the electrodes on the wall-engaging face of pad members 60, 61 and 62 respectively, from each other.

The electrical circuitry associated with the electrode configuration of FIGURE 4 is contained within the boxes 63, 64 and 65. The circuitry within the boxes 63, 64 and 65 are identical and only circuitry within box 65 will be shown in detail. Looking at electrode circuitry box 65, an amplifier 66 supplies an output signal to a transformer 67. One side of the secondary winding 68 of transformer 67 is connected to the current return electrode $B_0$ and the other side of secondary winding 68 is connected through the primary winding 69 of a transformer 70 to the survey current electrode $A_0$, and to one side of the primary winding 71 of a transformer 72. The secondary winding of transformer 72 is coupled to the input of amplifier 66. The other side of the primary winding 71 is connected to the monitor electrode M and to one side of the primary winding 73 of a transformer 74. The secondary winding of transformer 74 is connected to the input of an amplifier 75. The output from amplifier 75 is supplied to the primary winding of a transformer 76, the secondary winding 77 of which is connected between the focusing electrode $A_1$ and the current return electrode $B_1$. An oscillator 76 supplies an output signal to the primary winding of a transformer 77, the secondary winding 78 of which is connected between the potential reference electrode N and the other side of the primary winding 73 of transformer 74, and to the equivalent circuitry within electrode circuitry boxes 63 and 64.

The secondary winding of transformer 70 is connected between chassis ground and to one side of a resistor $R_7$. The survey current electrode $A_0$ of pad member 61 is supplied with current from the electrode circuitry box 64 associated therewith, through the primary winding of a transformer 79, secondary winding 80 of which is connected between chassis ground and one side of a resistor $R_8$. Likewise, the survey current electrode $A_0$ of pad member 60 is supplied with current from the electrode circuitry box 63 associated therewith, through the primary winding of a transformer 81, the secondary winding 82 of which is connected between chassis ground and one side of a resistor $R_9$. The other side of resistors $R_7$, $R_8$, and $R_9$ are connected to one side of a resistor $R_{10}$ and to one input of an amplifier 83. The other side of resistor $R_{10}$ is connected to chassis ground and the other input to amplifier 83. The output of amplifier 83 is supplied to the input of a phase-sensitive detector 84, the phase-reference signal being supplied from oscillator 76. The output of phase-sensitive detector 84 is supplied to the surface of the earth through conductors within the multiconductor cable 14.

Concerning the operation of the apparatus of FIGURE 4, the oscillator 76 supplies a constant voltage signal to the secondary winding of transformer 77, which develops a constant reference voltage $E_{ref}$ with respect to the potential of the reference electrode N on one side of the primary winding 73 of transformer 74. Potential reference electrode N is considered to be at substantially zero potential. Amplifier 75 monitors the potential difference between the voltage on monitor electrode M and $E_{ref}$ and supplies sufficient current, via transformer 76, between focusing electrode $A_1$ and current return electrode $B_1$ so as to maintain the voltage on monitor electrode M at the same potential as $E_{ref}$. Amplifier 66 monitors the difference in potential between the voltages on monitor electrode M and survey current electrode $A_0$, via transformer 72, and supplies sufficient current between survey current electrode $A_0$ and current return electrode $B_0$ so as to maintain survey current electrode $A_0$ substantially at the same potential as monitor electrode M. Thus, the voltage developed across the secondary winding of transformer 70 is proportional to the magnitude of the survey current, which is proportional to the conductivity of the surrounding earth formations, since the voltage of survey electrode $A_0$ is maintained constant. For a more detailed explanation of this operation, see the above-named Doll et al. Patent No. 3,132,298. The signals proportional to the survey current supplied to pad members 60 and 61 are derived across the secondary windings 80 and 82 of transformers 79 and 81 respectively. The resistance of resistors $R_7$, $R_8$ and $R_9$ are substantially greater than the resistance of resistor $R_{10}$ for the same reason as with the FIGURE 3 apparatus.

Thus, it can be seen that the voltage developed across resistor $R_{10}$ is proportional to the average of the currents supplied to the survey current electrodes $A_0$ of pad members 60, 61 and 62, and thus proportional to the average of the conductivity measured by these pad members. Phase-sensitive detector 84 supplies a DC signal to the surface of the earth which is proportional to that portion of the output signal from amplifier 83 which is inphase with the oscillator 76 output signal.

Looking now at FIGURE 5, there is shown another embodiment of the present invention utilizing an electrode configuration of the type shown in U.S. Patent No. 2,712,629 granted to H. G. Doll on July 5, 1955. The pad members 90, 91 and 92 each have a centrally located survey electrode $A_2$ surrounded by a concentric pair of monitor electrodes $M_4$ and $M_5$ and an outer focusing electrode concentrically surrounding the $A_2$, $M_4$ and $M_5$ electrodes. That portion of the pad members 90, 91 and 92 between the various electrodes is made of an insulation material. Pad members 90, 91 and 92 can be mounted to the central support member in the same manner as the pad members of FIGURE 4.

The electrical circuitry for driving the electrodes on pad members 90, 91 and 92 are contained within electrode circuitry boxes 93, 94 and 95. Only the electrode circuitry box 95 is shown in detail, electrode circuitry boxes 93 and 94 being identical. The output of an oscillator 96 is connected to the primary winding of a transformer 97, the secondary winding 98 of which is connected between a current return electrode $B_0$ and one side of resistors $R_{11}$, $R_{12}$ and $R_{13}$.

Looking now at the electrode circuitry box 95, the other side of resistor $R_{11}$ is connected to central survey current electrode $A_2$. Monitor electrodes $M_4$ and $M_5$ of pad member 92 are connected across the primary winding 99 of a transformer 100, the secondary winding of which is connected to the input of an amplifier 101. The output from amplifier 101 is connected to the primary winding of a transformer 102, the secondary winding 103 of which is connected between the current return electrode $B_1$ and the outer focusing electrode $A_3$. The monitor electrode $M_4$ is also connected to one side of the primary winding 104 of a transformer 105, the other side being connected to the potential reference electrode N. The secondary winding of transformer 105 is connected to the input of an amplifier 106. One side of the secondary winding of transformer 105 is also connected to chassis ground. The output from amplifier 106 is connected to the input of a phase-sensitive detector 107, a phase-reference signal from oscillator 96 also being supplied to phase-sensitive detector 107.

Oscillator 96 also supplies a phase-reference signal to a phase-sensitive detector equivalent to detector 107 within electrode circuitry boxes 93 and 94. The output from phase-sensitive detector 107 is supplied to one side of a resistor $R_{14}$. In like fashion, the output from the equivalent phase-sensitive detector in electrode circuitry box 94 is connected to one side of a resistor $R_{15}$ and the equivalent phase-sensitive detector in electrode circuitry box 93 is connected to one side of a resistor $R_{16}$. The other side of resistors $R_{14}$, $R_{15}$ and $R_{16}$ are connected to one side of a resistor $R_{17}$ and one input to an amplifier 108, the other side of resistor $R_{17}$ and the other input to amplifier 108 being connected to chassis ground. The output from amplifier 108 is sent to the surface of the earth through multiconductor cable 14.

Now concerning the operation of the FIGURE 5 apparatus, oscillator 96 develops a constant voltage signal across the secondary winding of transformer 97. The values of resistors $R_{11}$, $R_{12}$ and $R_{13}$ are sufficiently high so that the current supplied to the survey electrode $A_2$ of pad members 90, 91 and 92 is substantially constant. Amplifier 101 monitors the difference in potential between monitor electrodes $M_4$ and $M_5$ via transformer 100 and supplies sufficient current between focusing electrode $A_3$ and current return electrode $B_1$ as to maintain the difference in potential between monitor electrodes $M_4$ and $M_5$ substantially equal to zero. Thus, the potential of electrodes $A_2$, $M_4$, $M_5$ and $A_3$ are substantially the same. This potential with respect to the potential reference electrode N, using monitor electrode $M_4$ in this case, is developed across primary winding 104 of transformer 105, amplified by amplifier 106 and detected by phase-sensitive detector 107. Thus, the output signal from phase-sensitive detector 107 is a DC signal proportional to that portion of the potential on monitor electrode $M_4$ which is in-phase with the signal from oscillator 96. The same procedure takes place within electrode circuitry boxes 93 and 94.

Since the current supplied to each survey electrode of each pad member is substantially constant, the output signal from phase-sensitive detector 107 of electrode circuitry box 95 is proportional to resistivity. The same applies to pad members 90 and 91. Resistor networks $R_{14}$, $R_{15}$, $R_{16}$ and $R_{17}$ determine the average value of these resistivity readings and applies them to amplifier 108 for transmittal to the surface of the earth.

This utilization, in FIGURE 5, of a separate phase-sensitive detector 107 for the electrode circuitry associated with each pad member could also be utilized in the FIGURE 4 apparatus. This utilization of a phase-sensitive detector for the electrode circuitry associated with each pad member is desirable where the phases of the resistivity or conductivity signals derived from each electrode circuitry box may be different. Likewise, a constant current circuit similar to that shown in FIGURE 5 could also be used in the FIGURE 4 embodiment. Likewise, a constant voltage circuit could be utilized with the FIGURE 5 circuitry and the phase-sensitive detection could take place after the signals from the pad members are averaged, as in the FIGURE 4 apparatus.

In the apparatus of FIGURES 4 and 5, it is desired to obtain a single reading of resistivity or conductivity of the surrounding earth formations. Thus, the ratio of the well logging measurements are not taken in the FIGURE 4 or 5 apparatus as in the FIGURE 3 apparatus. Thus, if the measurements from one of the pad members are in error, the average reading will likewise be in error. Although this error is only ⅓ as great in the FIGURES 4 and 5 apparatus as would be the case if only one pad member were utilized, it would be desirable to reduce this error substantially to zero if possible.

Looking now at FIGURE 6, there is shown the apparatus for reducing this error substantially to zero. The electrode configuration shown in FIGURE 4 utilizing pad members 60, 61 and 62 is used in the FIGURE 6 embodiment. Only the central survey electrode $A_0$ of pad members 60, 61 and 62 is shown in FIGURE 6. The electrode circuitry boxes 63, 64 and 65, oscillator 76, transformer 77 and transformers 70, 79 and 81 are identical with the identically numbered apparatus in FIGURE 4. Likewise, amplifier 83 and phase-sensitive detector 84 are the same as the identically numbered apparatus in FIGURE 4. All of the above-named apparatus is likewise connected in the identical manner as in FIGURE 4, and will not be described further. In the FIGURE 6 apparatus, control circuitry 109 has been added for providing accurate borehole measurements under adverse borehole conditions.

Now looking at control circuitry 109, the secondary windings of transformers 70, 79 and 81 are connected between chassis ground and the inputs to inhibit gates 110, 111 and 112 respectively. The output of inhibit gates 110, 111 and 112 are connected through resistors $R_7$, $R_8$ and $R_9$ respectively to one side of a resistor $R_{18}$ (resistors $R_7$, $R_8$, $R_9$ and $R_{18}$ comprising an averaging network) and to the input to an inhibit gate 113, and to one input to the amplifier 83. The output from inhibit gate 113 and the other side of resistor $R_{18}$ are connected through the resistor $R_{10}$ to chassis ground. The amplifier 83 is also connected to chassis ground.

The junction between the secondary winding of transformer 70 and the inhibit gate 110 is connected to one side of the primary winding 113 of a transformer 114, the other side of the primary winding 113 being connected to the junction point between the secondary winding 82 of transformer 81 and inhibit gate 112. The junction between the secondary winding of transformer 70 and inhibit gate 110 is also connected to one side of the primary winding 115 of a transformer 116, the other side of primary winding 115 being connected to the junction between the secondary winding 80 of transformer 79 and inhibit gate 111. This junction between secondary winding 80 and inhibit gate 111 is also connected to one side of the primary winding 117 of a transformer 118, the other side of the primary winding 117 being connected to the junction between the secondary winding 82 and inhibit gate 112.

The secondary winding of transformer 114 is connected to the input of an amplifier, detector, and trigger 119; the secondary winding of transformer 116 is connected to the input of an amplifier, detector and trigger 120; and the secondary winding of transformer 118 is connected to the input of an amplifier, detector, and trigger 121. Amplifier, detector and trigger circuits 119, 120 and 121 comprise an amplifier input, the output of which is connected to a detector for converting the input AC signal to a DC signal, and a threshold trigger circuit as for example a Schmitt trigger for supplying a logic output signal "1" whenever a desired input level is attained. The detector could be a phase-sensitive detector if desired.

The output from amplifier, detector and trigger 119 is connected to one input of an AND gate 122 and one input of an AND gate 123. The output from amplifier, detector and trigger 120 is connected to one input of an AND gate 124 and the other input to AND gate 122. The output from amplifier, detector and trigger 121 is applied to the other input to AND gate 123 and the other input to AND gate 124. Amplifier, detector and trigger circuits 119, 120 and 121 are also connected to chassis ground as is the remainder of the logic circuitry. Since the logic circuitry utilizes either a "0" or "1" signal throughout, the ground symbol is left off the drawing for simplicity.

The output from AND gate 122 is supplied to the input of an inhibit gate 125 and one input of an AND gate 126. The output from AND gate 124 is supplied to the input of an inhibit gate 127 and another input to AND gate 126. The output from AND gate 123 is supplied to the input to an inhibit gate 128 and to the other input to AND gate 126. The output from inhibit gate 125 is supplied to the control terminal of inhibit gate 110 and the input of an OR gate 129. The output from inhibit gate 127 is supplied to the control terminal of inhibit gate 111 and to another input to OR gate 129. The output from inhibit gate 128 is supplied to the control terminal of inhibit gate 112 and to the other input to OR gate 129. The output from AND gate 126 is supplied to the control terminals of inhibit gates 125, 127 and 128. The output from OR gate 129 is supplied to the control terminal of inhibit gate 113.

When investigating subsurface earth formations surrounding a borehole with the plurality of pad members shown in FIGURE 6, it may happen that at least part of one or more of the pad members will become removed from the face of the borehole wall. When this happens, it would be desirable to determine which one of the pad members has become removed from the face of the borehole wall, and remove the well logging measurements derived from that particular pad member from the averaged measurements. It can be assumed that for most all borehole conditions, the resistivity at all circumferential points around the borehole are substantially identical. Thus, if the measurements derived from one of the pad members are different from the measurements derived from the other two pad members, it may be assumed that the one pad member is not positioned correctly in the borehole. The measurements obtained from that pad member should not be averaged.

Looking at FIGURE 6, this is accomplished by detecting the difference between the different combinations of pad members and inhibiting the erroneous measurement from being averaged. A voltage is induced into each of the secondary windings of transformers 70, 79 and 81, which voltage is proportional to the survey currents supplied to the survey electrodes of pad members 60, 61 and 62. Thus, these voltages are proportional to the conductivity of the earth formations directly in front of each respective pad member. Thus, a voltage proportional to the difference in magnitude between the conductivities measured by pad members 60 and 62 is applied to the input to amplifier, detector and trigger circuit 119 through transformer 114. In like fashion, the difference in magnitude between the conductivities measured by pad members 60 and 61 is applied to amplifier, detector and trigger circuit 121 through transformer 118, and the difference in conductivities measured by pad members 61 and 62 is applied to amplifier, detector and trigger circuit 120 through transformer 116. The impedance reflected to the primary windings 113, 115 and 117 from circuits 119, 120 and 121 are substantially high so as to minimize loading between the measure circuits. The trigger circuit portion of circuits 119, 120 and 121 is set at a predetermined value, which value indicates that the differences between the conductivities measured by any two pad members is sufficiently high so as to indicate that one of the measurements is in error.

If the conductivity measurement from pad member 62 is sufficiently different from the conductivity measurements from pad members 60 and 61, AND gate 122 will be energized. Likewise, if the conductivity measurement from pad member 61 is sufficiently different from the other pad members, AND gate 124 will be energized, and if the conductivity measurement from pad member 60 is sufficiently different, AND gate 123 will be energized. If the conductivity measurement from pad member 62 is bad, the output from AND gate 122 will energize inhibit gate 110, thus inhibiting the conductivity measurement from pad member 62 from being averaged. Now, since one of the resistors, in this case $R_7$, is removed from the circuit, the resistor $R_{18}$ must be added in series with resistor $R_{10}$ to maintain the same resistance ratio of the averaging resistors. The value of resistor $R_{18}$ must be equal to $R_{10}/2$. Thus, the output from AND gate 122 energizes inhibit gate 113 through OR gate 129, thus connecting resistor $R_{18}$ in series with resistor $R_{10}$. The same principle applies to the outputs from AND gates 123 and 124. That is, when the conductivity measurement from pad member 61 is in error, the output from AND gate 124 energizing inhibit gate 111 will isolate the measurement from pad member 61 from being averaged and will add resistor $R_{18}$ in series with $R_{10}$ in the same manner. Likewise, the output from AND gate 123 energizing inhibit gate 112 will isolate the measurement from pad member 60 from being averaged and will add resistor $R_{18}$ in series with $R_{10}$ in the same manner.

On rare occurrences, it may happen that the measurements obtained from two of the pad members are in error, as for example, when two of the pad members become removed from the borehole wall. In this case, the measurements from all three pad members will be different. Since it cannot be determined which one of the pad member measurements is accurate, it would be desirable to obtain the average of the measurements from all three pad members in this case.

When the conductivity measurements from all three pad members are different, AND gates 122, 123 and 124 will all be energized. These outputs from AND gates 122, 123 and 124 will energize AND gate 126, which energizes inhibit gates 125, 127 and 128, thus allowing the averaging of the conductivity measurements from all three pad members. Additionally, the resistor $R_{18}$ is short circuited by inhibit gate 113, which is now de-energized. A small delay could be built into the inputs to inhibit gates 125, 127 and 128 to allow time for AND gate 126 to be energized, if necessary.

It can thus be seen that the apparatus of FIGURE 6 will provide accurate conductivity measurements under adverse borehole conditions when the measurement for one of the pad members is in error. The FIGURE 6 apparatus will also provide substantially accurate measurement even where two or more of the pad member measurements are in error.

The apparatus shown within the control box 109 could be utilized with the measurements obtained from any other type of pad mounted electrode system, such as that shown in FIGURE 5 or FIGURE 3. Also, a diode matrix arrangement could be utilized in place of the control circuitry 109. Additionally, a ratio system for determining which of the pad member measurements are in error could be used instead of the difference system shown in FIGURE 6. (Transformers 114, 116 and 118.) Also the principles set forth in this application are not limited to three pad members, but could readily be applied to two, four, five or more pad members.

While there have been described what are at present considered to be preferred embodiments of this invention, it will be obvious to those skilled in the art that various changes and modifications may be made therein without

What is claimed is:

1. Apparatus for investigating earth formations traversed by a borehole comprising:
   (a) a central support member adapted for movement through the borehole;
   (b) a plurality of pad members supported by the central support member and adapted to engage the borehole wall;
   (c) a plurality of electrodes, at least some of which are located on the plurality of pad members;
   (d) means for supplying current to at least one of the electrodes for emission into the surrounding earth formations;
   (e) means coupled to at least one electrode on each pad member for deriving a signal representative of a characteristic of the surrounding earth formations; and
   (f) means for averaging the derived signals to produce an averaged output signal which is more accurately representative of the formation characteristic.

2. The apparatus of claim 1 wherein the plurality of electrodes includes:
   (a) a central survey electrode located on each pad member;
   (b) an outer focusing electrode surrounding the central survey electrode; and the means for supplying current to at least one of the electrodes includes:
      (1) means for supplying current to the central survey electrode; and
      (2) means responsive to a potential gradient between the central survey electrode and outer focusing electrode for supplying focusing current to the outer focusing electrode for focusing the survey current in an outward direction from the borehole wall; and the formation characteristic is the conductivity or resistivity of the surrounding earth formations derived from an electrical parameter of the central survey electrode.

3. Apparatus for investigating earth formations traversed by a borehole comprising:
   (a) a central support member adapted for movement through the borehole;
   (b) a plurality of pad members supported by the central support member and adapted to engage the borehole wall;
   (c) a plurality of electrodes, at least some of which are located on the plurality of pad members;
   (d) means for supplying current to at least one of the electrodes for emission into the surrounding earth formations;
   (e) means coupled to a first electrode on each pad member for providing a first signal representative of the average of the potentials on the first electrodes;
   (f) means coupled to a second electrode on each pad member for providing a second signal representative of the average of the potentials of the second electrodes;
   (g) means coupled to at least one other electrode for providing a third signal representative of the potential of said at least one other electrode; and
   (h) means responsive to the first, second, and third signals for providing first and second output signals indicative of the characteristic of the surrounding earth formations.

4. Apparatus for investigating earth formations traversed by a borehole comprising:
   (a) a central support member adapted for movement through the borehole;
   (b) a plurality of pad members supported by the central support member and adapted to engage the borehole wall;
   (c) a plurality of electrodes, at least some of which are located on the plurality of pad members;
   (d) means for supplying current to at least one of the electrodes for emission into the surrounding earth formations;
   (e) means coupled to a first electrode on each pad member for providing a first signal representative of the average of the potentials on the first electrodes;
   (f) means coupled to a second electrode on each pad member for providing a second signal representative of the average of the potentials of the second electrodes;
   (g) means coupled to a third electrode on each pad member for providing a third signal representative of the average of the potentials of the third monitor electrodes; and
   (h) means responsive to the first, second, and third signals for providing first and second output signals indicative of the characteristic of the surrounding earth formations.

5. Apparatus for investigating earth formations traversed by a borehole comprising:
   (a) a central support member adapted for movement through the borehole;
   (b) a plurality of pad members supported by the central support member and adapted to engage the borehole wall;
   (c) a plurality of electrodes, at least some of which are located on the plurality of pad members;
   (d) means for supplying current to at least one of the electrodes for emission into the surrounding earth formations;
   (e) means coupled to a first electrode on each pad member for providing a first signal representative of the average of the potentials on the first electrodes;
   (f) means coupled to a second electrode on each pad member for providing a second signal representative of the average of the potentials of the second electrodes;
   (g) means coupled to a remote monitor electrode for providing a third signal representative of the potential of said at least one other electrode; and
   (h) means responsive to the first, second, and third signals for providing first and second output signals indicative of the characteristic of the surrounding earth formations.

6. Apparatus for investigating earth formations traversed by a borehole comprising:
   (a) a central support member adapted for movement through the borehole;
   (b) a plurality of pad members supported by the central support member and adapted to engage the borehole wall;
   (c) a plurality of electrodes, at least some of which are located on the plurality of pad members;
   (d) means for supplying current to at least one of the electrodes for emission into the surrounding earth formations;
   (e) means coupled to a first electrode on each pad member for providing a first signal representative of the average of the potentials on the first electrodes;
   (f) means coupled to a second electrode on each pad member for providing a second signal representative of the average of the potentials of the second electrodes;
   (g) means coupled to at least one other electrode for providing a third signal representative of the potential of said at least one other electrode; and
   (h) means responsive to the first, second, and third signals for providing first and second output signals indicative of the characteristic of the surrounding earth formations, said means including:
      (1) means responsive to the difference in potential between the first and second signals for providing the first output signal; and (2) means responsive to the difference in potential between the second and third signals for providing the second output signal.

7. Apparatus for investigating earth formations traversed by a borehole comprising:
(a) a central support member adapted for movement through the borehole;
(b) a plurality of pad members supported by the central support member and adapted to engage the borehole wall;
(c) a plurality of electrodes, said electrodes including:
(1) a first monitor electrode located on each pad member;
(2) a second monitor electrode located on each pad member at a greater distance from the current-emitting electrode than the first monitor electrode;
(3) a third monitor electrode located on each pad member at a greater distance from the current-emitting electrode than the second monitor electrode;
(d) means for supplying current to at least one electrode for emission into the surrounding earth formations;
(e) means coupled to the first monitor electrode on each pad member for providing a first signal representative of the average of the potentials of the first monitor electrodes;
(f) means coupled to the second monitor electrode on each pad member for providing a second signal representative of the average of the potentials of the second monitor electrodes;
(g) means coupled to the third monitor electrode on each pad member for providing a third signal representative of the average of the potentials of the third monitor electrodes;
(h) means responsive to the difference in potential between the first and second signals for providing a first output signal; and
(i) means responsive to the difference in potential between the second and third signals for providing a second output signal, a relationship between the first and second output signals being representative of the presence of mudcake surrounding the borehole.

8. Apparatus for investigating earth formations traversed by a borehole comprising:
(a) a central support member adapted for movement through the borehole;
(b) a plurality of pad members supported by the central support member and adapted to engage the borehole wall;
(c) a plurality of electrodes, at least some of which are located on the plurality of pad members;
(d) means for supplying current to at least one of the electrodes for emission into the surrounding earth formations;
(e) means for deriving a separate signal representative of an earth formation characteristic from at least one electrode on each pad member;
(f) averaging means for providing an averaged output signal representative of the averaged value of a plurality of the derived characteristic signals; and
(g) control means responsive to the derived characteristic signals for supplying only those characteristic signals to the averaging means which have relatively the same value.

9. Apparatus for investigating earth formations traversed by a borehole comprising:
(a) a central support member adapted for movement through the borehole;
(b) a plurality of pad members supported by the central support member and adapted to engage the borehole wall;
(c) a plurality of electrodes, at least some of which are located on the plurality of pad members;
(d) means for supplying current to at least one of the electrodes for emission into the surrounding earth formations;
(e) means for deriving a separate indication of the characteristic from at least one electrode on each pad member;
(f) averaging means for providing an averaged output signal representative of the averaged value of a plurality of the derived characteristic indications;
(g) first control means responsive to the derived characteristic indications for providing a control signal when at least one of the characteristic indications is relatively different from the other characteristic indications, the control signal being indicative of which of said at least one of the characteristic indications is relatively different; and
(h) second control means responsive to the control signal for inhibiting said at least one of the characteristic indications which is relatively different, from being supplied to the averaging means.

10. The apparatus of claim 8 wherein the control means also supplies all of the derived characteristic signals to the averaging means when all of the derived characteristic signals are relatively different from each other.

11. The apparatus of claim 9 and further including:
(a) means coupled to the first control means for providing an output signal when all of the characteristic indications are relatively different from each other; and
(b) means responsive to the output signal for enabling all of the derived characteristic indications to be averaged by the averaging means.

12. Apparatus for investigating earth formations traversed by a borehole comprising:
(a) a central support member adapted for movement through the borehole;
(b) a plurality of investigating devices located at a plurality of circumferential points around the borehole, each investigating device supported by the central support member and adapted for producing an output signal representative of a formation characteristic; and
(c) means responsive to the output characteristic signals for averaging the characteristic signals to produce an averaged output signal which is more accurately representative of the formation characteristic.

13. The apparatus of claim 12 and further including means for inhibiting at least one of the derived signals from being averaged in response to said at least one of the derived signals being relatively different in magnitude from the other derived signals.

14. The apparatus of claim 13 and further including means for enabling all of the derived signals to be averaged in response to all of the derived signals being relatively different in magnitude from each other.

15. A method of investigating earth formations traversed by a borehole comprising:
(a) moving a plurality of well logging investigating devices through the borehole, the investigating devices being located at a plurality of circumferential points around the borehole;
(b) deriving a signal from each of the investigating devices indicative of a characteristic of the surrounding earth formations;
(c) averaging the signals derived from each of the investigating devices; and
(d) generating one signal indicative of the average value of the derived signals.

16. The method of claim 15 and further including:
(a) inhibiting at least one of the derived signals from being averaged in response to said at least one of the derived signals being relatively different in magnitude from the other derived signals.

17. The method of claim 16 and further including:
(a) enabling all of the derived signals to be averaged in response to all of the derived signals being relatively different in magnitude from each other.

References Cited

UNITED STATES PATENTS

| | | | |
|---|---|---|---|
| 2,813,248 | 11/1957 | Ferre | 324—10 XR |
| 2,961,600 | 11/1960 | Tanguy | 324—10 XR |
| 3,046,474 | 7/1962 | Arps | 324—10 XR |
| 3,075,142 | 1/1963 | Albright et al. | 324—1 |
| 3,105,191 | 9/1963 | Schopper | 324—10 |
| 3,132,298 | 5/1964 | Doll et al. | 324—10 |
| 3,256,480 | 6/1966 | Runge et al. | 324—10 |
| 3,264,555 | 8/1966 | Barret | 324—6 |

RUDOLPH V. ROLINEC, *Primary Examiner.*

G. R. STRECKER, *Assistant Examiner.*